(12) United States Patent
Koyama et al.

(10) Patent No.: US 11,548,291 B2
(45) Date of Patent: Jan. 10, 2023

(54) METHOD FOR PRODUCING INK JET PRINTER AND INK JET PRINTER

(71) Applicant: SEIKO EPSON CORPORATION, Tokyo (JP)

(72) Inventors: Fumio Koyama, Hara-mura (JP); Shinpei Shinohara, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 17/123,162

(22) Filed: Dec. 16, 2020

(65) Prior Publication Data
US 2021/0187962 A1 Jun. 24, 2021

(30) Foreign Application Priority Data

Dec. 18, 2019 (JP) .............................. JP2019-227808

(51) Int. Cl.
*B41J 2/175* (2006.01)
*B41J 2/21* (2006.01)
*G06K 15/10* (2006.01)

(52) U.S. Cl.
CPC ............. *B41J 2/2114* (2013.01); *B41J 2/175* (2013.01); *G06K 15/102* (2013.01)

(58) Field of Classification Search
None
See application file for complete search history.

(56) References Cited

U.S. PATENT DOCUMENTS

| 5,347,369 | A | * | 9/1994 | Harrington | .......... | H04N 1/4078 |
| | | | | | | 358/521 |
| 7,173,734 | B2 | * | 2/2007 | Klassen | ............... | H04N 1/4092 |
| | | | | | | 347/14 |
| 7,690,749 | B2 | | 4/2010 | Kachi | | |
| 8,212,847 | B2 | * | 7/2012 | Kella | ................. | H04N 1/40025 |
| | | | | | | 347/131 |
| 8,419,146 | B2 | | 4/2013 | Itogawa | | |
| 2019/0263139 | A1 | | 8/2019 | Tanase et al. | | |

FOREIGN PATENT DOCUMENTS

| JP | H09-156130 A | 6/1997 |
| JP | 2005-313633 A | 11/2005 |
| JP | 2011-136524 A | 7/2011 |
| JP | 2019-147249 A | 9/2019 |

* cited by examiner

Primary Examiner — Alejandro Valencia
(74) *Attorney, Agent, or Firm* — Global IP Counselors, LLP

(57) ABSTRACT

A technique includes printing a first image including a plurality of edge pixels and a second image with a lower ratio of edges pixels than the first image and an average density equal to that of the first image and determining a value of a processing parameter so that the average densities of the first image and the second image match. The technique is configured to realize appropriate pre-print processing while preventing the average densities from being low due to the excessive pre-print processing or being high due to the insufficient pre-print processing.

6 Claims, 10 Drawing Sheets

FIG. 3

| 5 | 1 | 6 |
|---|---|---|
| 2 | 0 | 3 |
| 7 | 4 | 8 |

FIG. 6

| | | | | | | | | | | |
|---|---|---|---|---|---|---|---|---|---|---|
| | 255 | 255 | 255 | · | · | · | 255 | 255 | 255 | |
| | 255 | 255 | 255 | · | · | · | 255 | 255 | 255 | |
| LUMINANCE VALUE | 255 | 255 | 255 | · | · | · | 255 | 255 | 255 | R1 |
| | 254 | 253 | 251 | · | · | · | 52 | 43 | 31 | ← EDGE PART |
| | 0 | 0 | 0 | · | · | · | 0 | 0 | 0 | |
| | 31 | 43 | 52 | · | · | · | 251 | 253 | 254 | ← EDGE PART |
| | 255 | 255 | 255 | · | · | · | 255 | 255 | 255 | |
| | 255 | 255 | 255 | · | · | · | 255 | 255 | 255 | |
| | 254 | 253 | 251 | · | · | · | 52 | 43 | 31 | ← EDGE PART |
| | 0 | 0 | 0 | · | · | · | 0 | 0 | 0 | |
| | 31 | 43 | 52 | · | · | · | 251 | 253 | 254 | ← EDGE PART |

| | | | | | | | | | | |
|---|---|---|---|---|---|---|---|---|---|---|
| LUMINANCE VALUE | 212 | 212 | 212 | · | · | · | 212 | 212 | 212 | R2 |
| | 212 | 212 | 212 | · | · | · | 212 | 212 | 212 | |
| | 212 | 212 | 212 | · | · | · | 212 | 212 | 212 | |
| | 212 | 212 | 212 | · | · | · | 212 | 212 | 212 | |
| | 212 | 212 | 212 | · | · | · | 212 | 212 | 212 | |
| | 212 | 212 | 212 | · | · | · | 212 | 212 | 212 | |
| | 212 | 212 | 212 | · | · | · | 212 | 212 | 212 | |
| | 212 | 212 | 212 | · | · | · | 212 | 212 | 212 | |
| | 212 | 212 | 212 | · | · | · | 212 | 212 | 212 | |
| | 212 | 212 | 212 | · | · | · | 212 | 212 | 212 | |

METHOD FOR PRODUCING INK JET PRINTER AND INK JET PRINTER

The present application is based on, and claims priority from JP Application Serial Number 2019-227808, filed Dec. 18, 2019, the disclosure of which is hereby incorporated by reference herein in its entirety.

BACKGROUND

1. Technical Field

The present disclosure relates to an ink jet printer.

2. Related Art

In ink jet printing, at an edge pixel with great contrast relative to an adjacent part, ink in a dark part bleeds toward a light part and the image blurs, or a light color is influenced more than a dark color, and thus the overall color is darker. In the related art, edge processing of reducing the ink amount at edge pixels to thereby suppress ink bleeding may be performed as pre-print processing. JP-A-2019-147249 discloses such edge processing.

However, a partially printed character or a deficiently thin line may occur due to an excessively large reduction in ink amount in edge processing while a blurred character or a blurred thin line may occur due to ink bleeding caused by an excessively small reduction in ink amount. Such failures may occur not only in edge processing but also in other pre-print processing of reducing the ink amount in a specific part of an image.

SUMMARY

According to a first aspect of the present disclosure, a method for producing an ink jet printer configured to print in accordance with a processing parameter is provided. The method includes (a) printing, in association with a plurality of candidate values of a processing parameter, a first image including a plurality of edge pixels and a second image with a lower ratio of edge pixels than the first image and an average density equal to an average density of the first image, (b) determining a value of the processing parameter so that a printing average density of the first image that is printed and exhibits bleed matches a printing average density of the second image that is printed and exhibits bleed, and (c) storing, in memory in an ink jet printer, the determined value of the processing parameter. By doing so, an ink jet printer that can perform printing at appropriate printing average densities irrespective of ink bleeding, that is, an ink jet printer that enables high-quality printing can be produced. The phrase "a lower ratio of edge pixels than the first image" may assume that an edge pixel is not present or 0%.

According to a second aspect of the present disclosure, an ink jet printer configured to print an image is provided. The ink jet printer includes an acquisition section configured to acquire a first image including a plurality of edge pixels and a second image with a lower ratio of edge pixels than the first image and an average density equal to an average density of the first image, and a print section configured to print the first image and the second image. The print section prints so that a printing average density of the first image that is printed and exhibits bleed matches a printing average density of the second image that is printed and exhibits bleed.

According to a third aspect of the present disclosure, a method for producing an ink jet printer configured to print by performing pre-print processing of reducing the ink amount in a specific part of an image is provided. The method includes (a) preparing image data including a first image including a plurality of edge pixels and a second image with a lower ratio of edge pixels than the first image and an average density equal to an average density of the first image, (b) determining a value of a processing parameter of the pre-print processing so that a printing average density of the first image after the pre-print processing is performed matches a printing average density of the second image after the pre-print processing is performed, and (c) storing, in memory in an ink jet printer, the value of the processing parameter.

BRIEF DESCRIPTION OF THE DRAWINGS

FIG. 3 is an explanatory diagram of adjacent pixels used in edge extraction processing.

FIG. 6 is an explanatory diagram of exemplary luminance values of the first image and the second image.

DESCRIPTION OF EXEMPLARY EMBODIMENTS

A. First Embodiment

Figure 1:
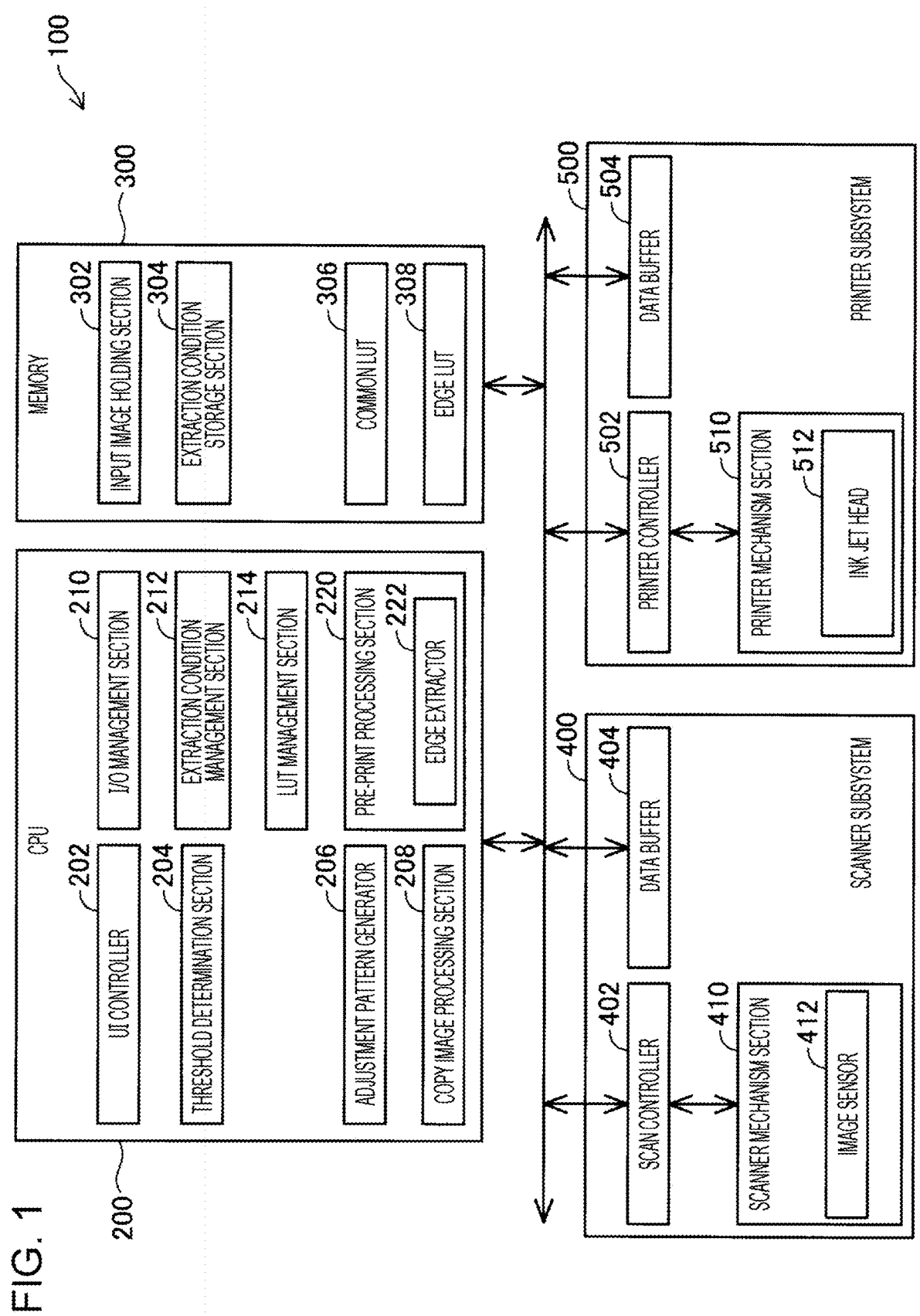
FIG. 1 is a block diagram of an ink jet printer according to a first embodiment.

FIG. 1 is a block diagram of an ink jet printer 100 according to a first embodiment. The ink jet printer 100 includes a CPU 200, memory 300, a scanner subsystem 400, and a printer subsystem 500. The ink jet printer 100 is a multifunctional printer with a printer function, a scanner function, and a copy function. The copy function is for printing an image read by the scanner function. The CPU 200 and the printer subsystem 500 function as print sections in the present disclosure.

The CPU 200 realizes the functions of a UI controller 202, a threshold determination section 204, an adjustment pattern generator 206, a copy image processing section 208, an I/O management section 210, an extraction condition management section 212, a LUT management section 214, and a pre-print processing section 220. The CPU 200 executes a software program stored in the memory 300 to realize the functions. A CPU is used as an example of a processor according to the present embodiment, but another processor such as an ASIC may be used.

The functions of the respective sections realized by the CPU 200 are as follows.

The UI controller 202 controls switching of a plurality of functions of the multifunctional printer. Specifically, the UI controller 202 controls input/output of a user interface component such as a button (not illustrated).

The threshold determination section 204 reads an adjustment pattern image (described below) printed on a printing medium by the scanner subsystem 400 and performs processing for determining an appropriate edge extraction threshold in accordance with the adjustment pattern image. The processing content of the threshold determination section 204 will be described below.

The adjustment pattern generator 206 generates a plurality of adjustment pattern images corresponding to a plurality of different edge extraction thresholds and marks the positions of edge pixels extracted by the respective edge extraction thresholds. The adjustment pattern generator 206 may acquire the adjustment pattern images from the outside. The adjustment pattern generator 206 acquires the adjustment pattern images both by generating them internally and by acquiring them from the outside, and the adjustment pattern generator 206 is also referred to as "acquisition section".

The copy image processing section 208 performs, in the copy function, image processing such as color matching, character/line emphasis, and correction and generates an image to be printed as a copying output from scanned data.

The I/O management section 210 manages inputting of an image to be printed and outputting of print dot data.

The extraction condition management section 212 manages changing/storing/applying of conditions for edge extraction.

The LUT management section 214 manages changing/storing/applying of color conversion look-up tables (LUTs) 306 and 308 configured to convert the RGB value of each pixel of an image to be printed into the ink amount usable in the ink jet printer 100.

The pre-print processing section 220 performs pre-print processing including color conversion processing and halftone processing on image data of an image to be printed and generates print dot data. The color conversion processing is to convert the RGB value of each pixel of an image to be printed into ink amount data with reference to the LUT 306 or 308. The halftone processing is to convert the ink amount data into print dot data indicating an arrangement of ink droplets. Here "pre-print processing" means processing that is performed before printing with print dot data is performed. The pre-print processing section 220 includes an edge extractor 222 according to the present embodiment.

The edge extractor 222 performs edge extraction processing described below. A pixel which is extracted as an edge in the edge extraction processing is referred to as an "edge pixel", and a pixel which is not extracted as an edge is referred to as a "non-edge pixel".

The memory 300 includes an input image holding section 302, an extraction condition storage section 304, the common LUT 306, and the edge LUT 308. The input image holding section 302 holds an input image for various processing. The extraction condition storage section 304 stores extraction conditions in the edge extraction processing. The extraction conditions include an edge extraction threshold and an adjacent pixel position to be referred to during edge extraction, for example. The common LUT 306 is a color conversion look-up table applied to non-edge pixels. The edge LUT 308 is a color conversion look-up table applied to edge pixels.

The edge LUT 308 may use the output of the common LUT 306 multiplied by a constant ink reduction coefficient, for example. Here "constant ink reduction coefficient" denotes a constant value independent of the input into the LUT and denotes a constant positive value of less than 1 by which the output of the LUT is multiplied. The ink reduction coefficient may be a constant value common across a plurality of chromatic inks usable in the ink jet printer 100. When the ink amount reduction coefficient is set as a constant value common across a plurality of chromatic inks, a color mixture ratio does not change between before and after edge processing at an edge part reproduced by mixing a plurality of chromatic inks, thereby advantageously preventing a change in color at the edge part. A chromatic ink reduction coefficient and an achromatic ink reduction coefficient may be set at different values.

The scanner subsystem 400 includes a scan controller 402, a data buffer 404, and a scanner mechanism section 410. The scan controller 402 controls the scanner mechanism section 410, outputs scanned data, and manages the data buffer 404. The scanner mechanism section 410 acquires an image by using an image sensor 412 and stores the image in the data buffer 404.

The printer subsystem 500 includes a printer controller 502, a data buffer 504, and a printer mechanism section 510. The printer controller 502 controls the printer mechanism section 510, inputs print dot data, and manages the data buffer 504. The printer mechanism section 510 includes an ink jet head 512 for each color and discharges inks onto a printing medium in accordance with print dot data. The printer mechanism section 510 may be configured as a serial system or as a line system. The serial system is a mechanism configured to print while scanning the head in the width direction of a printing medium. The line system is a mechanism configured to print by using a line-shaped head in which nozzles are arranged across almost the entire width of a printing medium.

Figure 2:
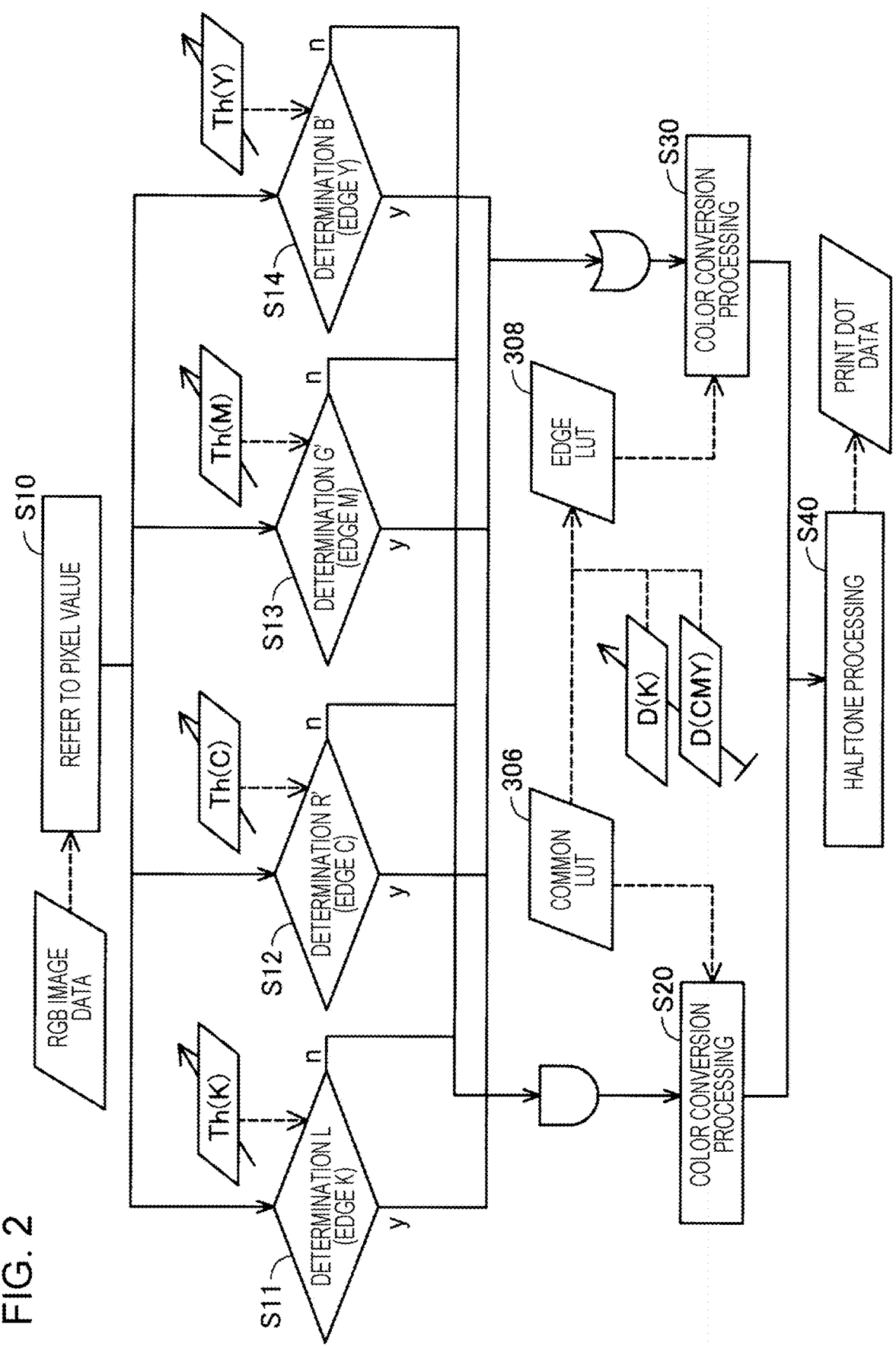
FIG. 2 is a flowchart of pre-print processing including edge processing.

FIG. 2 is a flowchart of the pre-print processing including the edge processing. For example, when RGB image data is input as an input image, the edge extractor 222 performs the edge extraction processing in steps S10 and S11 to S14. Specifically, the edge extractor 222 first refers to the pixel value of each pixel or a pixel of interest in an image in step S10. In steps S11 to S14, the edge extractor 222 further determines whether the pixel of interest corresponds to an edge pixel for each of a plurality of ink hues. Here, the four ink hues usable in the ink jet printer 100 are black K, cyan C, magenta M, and yellow Y. However, when ink other than that of the hues is usable, an edge pixel corresponding to the hue is extracted. An edge pixel is extracted only for black K in a monochrome ink jet printer in which only black K is usable.

Figure 3:
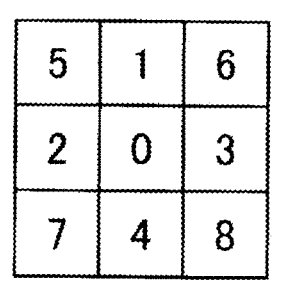

FIG. 3 is an explanatory diagram of adjacent pixels used in the edge extraction processing. According to the present embodiment, the edge extractor 222 performs the edge extraction processing by using a pixel of interest 0 and eight adjacent pixels 1 to 8. Of the eight adjacent pixels, only the four pixels 1 to 4, and not the diagonally adjacent pixels, may be used.

Whether the pixel of interest 0 is an edge pixel is determined by the evaluation value $E\_0$ of the pixel of interest 0 and the evaluation values $E\_1$ to $E\_8$ of the adjacent pixels 1 to 8. The evaluation value E_j of each pixel is calculated using the following Equation (1) and the RGB value of the pixel.

$$\text{Evaluation value } E\_j = \alpha 1 \times R + \alpha 2 \times G + \alpha 3 \times B \quad (1)$$

where the coefficients α1 to α3 are a combination of coefficients adapted to a complementary color of each ink and j is a value indicating a pixel position 0 to 8 in FIG. 3. For example, when an ideal ink is used, the coefficients α1 to α3 are as follows.

Evaluation value E_j(L) for ink K: (α1, α2, α3)=(1, 1, 1)
Evaluation value E_j(R) for ink C: (α1, α2, α3)=(1, 0, 0)
Evaluation value E_j(G) for ink M: (α1, α2, α3)=(0, 1, 0)
Evaluation value Ej(B) for ink Y: (α1, α2, α3)=(0, 0, 1)

The coefficients α1 to α3 may be set corresponding to the complementary color component values R', G', and B' of each of C, M, and Y used in the actual printer subsystem 500. For example, when there exists a pixel marked as print ink K only, the coefficients α1 to α3 may be set to reflect the contrast of the ink K. For example, when the pixel value of the marked pixel is expressed as a general RGB value, (α1, α2, α3)=(0.299, 0.587, 0.114) or the like may be used.

According to the present embodiment, when the following Equation (2) is established, the edge extractor 222 determines that the pixel of interest 0 is an edge pixel.

$$\text{Max}(|E\_\text{max} - E\_0|, |E\_\text{min} - E\_0|) > Th \quad (2)$$

where E_0 indicates the evaluation value of the pixel of interest 0, E_max indicates the maximum value among the evaluation values E_1 to E_8 of the adjacent pixels 1 to 8, E_min indicates the minimum value among the evaluation values E_1 to E_8 of the adjacent pixels 1 to 8, and Th indicates an edge extraction threshold. |E_max−E_0| denotes the absolute value of the difference between E_max and E_0 and |E_min−E_0| denotes the absolute value of the difference between E_min and E_0. Further, Max( ) denotes an operation of taking the maximum value of a numerical value in the parentheses.

As illustrated in FIG. 2, the edge extraction processing is performed on the ink hues K, C, M, and Y. The edge extraction threshold Th is therefore set for each of the hues K, C, M, and Y. A method for setting an edge extraction threshold Th for each hue will be further described below.

As another example, when the following Equation (3) is established, the edge extractor 222 may determine that the pixel of interest 0 is an edge pixel.

$$(E\_\text{max} - E\_0) > Th \quad (3)$$

When the Equation (3) is used, only the darker edge pixel is extracted.

When it is determined that the pixel of interest 0 is not an edge pixel for all the ink hues in steps S11 to S14 in FIG. 2, it is determined that the pixels are not edge pixels, and the processing proceeds to step S20 where the pre-print processing section 220 performs the color conversion processing with reference to the common LUT 306 for all the ink hues. On the other hand, when it is determined that the pixel of interest 0 is an edge pixel for one or more of the ink hues, it is determined that the pixels are edge pixels, and the processing proceeds to step S30 where the pre-print processing section 220 performs the color conversion processing with reference to the edge LUT 308 for all the ink hues. The RGB value is converted into the ink amount in the color conversion processing. As described above, the edge LUT 308 used in the present embodiment contains the ink amount as the output of the common LUT 306 multiplied by the constant ink reduction coefficient. When the edge LUT 308 is used for all the ink hues, a color mixture ratio does not change between before and after the edge processing at an edge part reproduced by mixing a plurality of chromatic inks, thereby advantageously preventing a change in color at the edge part. Instead of the edge LUT 308 being used, the ink reduction coefficient may be stored in the memory 300; the RGB value is first converted into the ink amount with reference to the common LUT 306 in step S30, and the ink amount may then be multiplied by the ink reduction coefficient.

When terminating the color conversion processing in step S20 or step S30, the pre-print processing section 220 performs the halftone processing in step S40 and converts the ink amount of each pixel into print dot data indicating an arrangement of ink droplets. When the print dot data is transferred to the printer subsystem 500, the printer subsystem 500 performs printing.

As described above, the ink amount is reduced more at the edge part than at the non-edge part when the edge LUT 308 is used in the color conversion processing, thereby restricting ink bleeding at the edge part. As described in Related Art, however, a partially printed character or a deficiently thin line is caused due to an excessively large reduction in ink amount, while ink bleeding is caused due to an excessively small reduction in ink amount. Thus in the present embodiment, an edge extraction threshold of each ink hue is determined to enable the appropriate edge processing while preventing the excessively large or excessively small reduction in ink amount in the edge processing.

Figure 4:
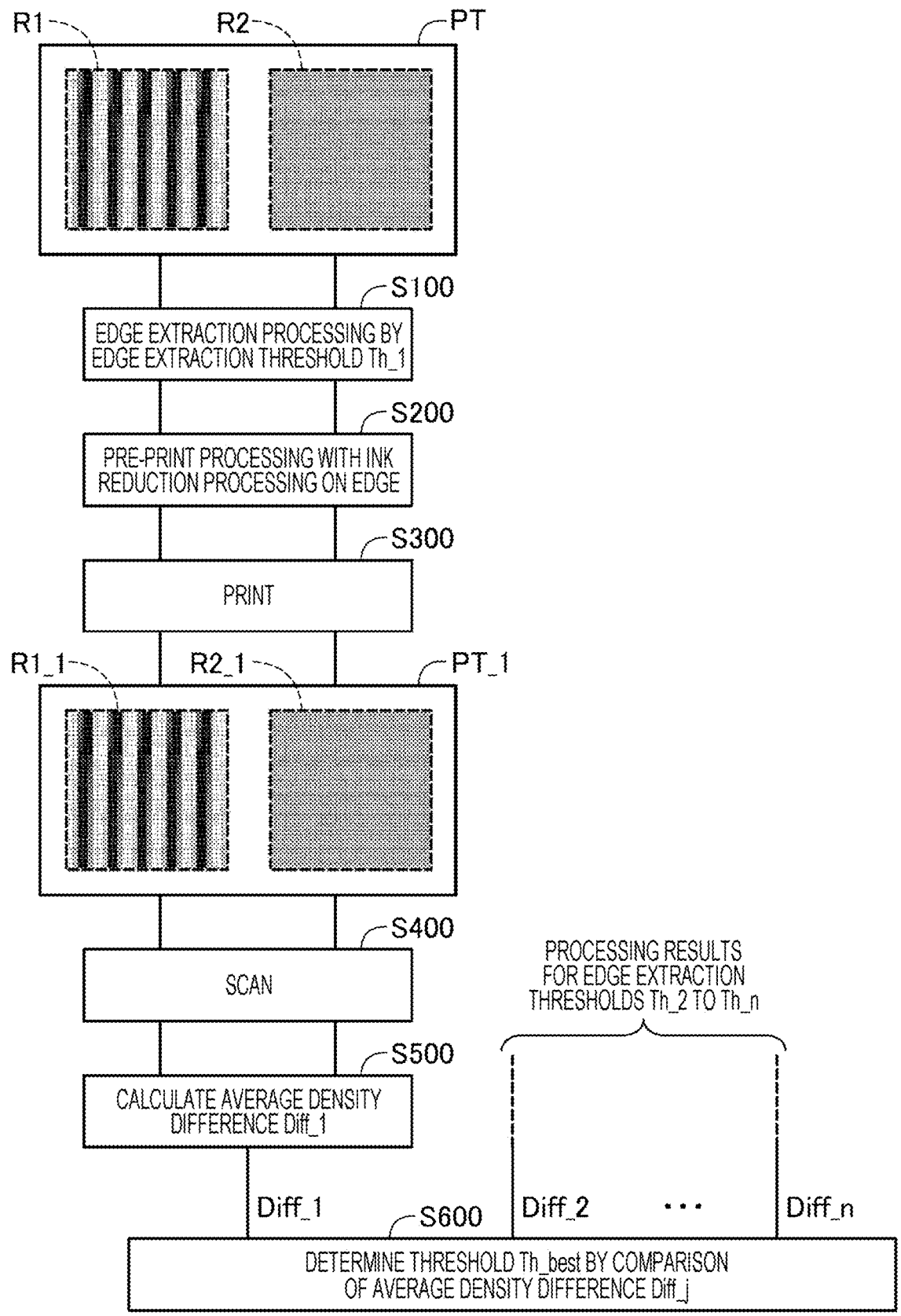
FIG. 4 is an explanatory diagram of a procedure of determining an edge extraction threshold according to the first embodiment.

FIG. 4 is an explanatory diagram of a procedure of determining an edge extraction threshold Th according to the first embodiment. The processing in FIG. 4 is performed on a plurality of ink hues K, C, M, and Y used in the ink jet printer 100 to determine the four edge extraction thresholds Th(K), Th(C), Th(M), and Th(Y). Processing of determining an edge extraction threshold Th(K) for black ink will be first described below.

To determine an edge extraction threshold Th, the adjustment pattern generator 206 first prepares image data of an adjustment pattern image PT including a first image R1 and a second image R2. The first image R1 includes a plurality of edge pixels. The second image R2 is different from the first image in edge pixels and is equal to the first image R1 in average density. Here, the expression "the first image R1 includes a plurality of edge pixels" means that a plurality of edge pixels are extracted when an appropriate edge extraction threshold is used. The expression "the second image R2 is different from the first image R1 in edge pixels" means that the first image R1 is different from the second image R2 in the number of edge pixels when the edge pixels are extracted from the first image R1 and the second image R2 by using the same edge extraction threshold. The difference between the numbers of edge pixels may be large enough to be clear in the following processing. The term "density" means a value indicating a density of a pixel with the same brightness as an average brightness obtained by colorimetrically measuring a region including both a dark-colored part and a light-colored part as a ratio of the dark-colored part in the region by defining the density of the dark-colored part or the solidly printed ink part as 100% and defining the light-colored part or white sheet with no ink as 0%. For example, when colorimetric average brightness of a pixel is the same as colorimetric brightness of a region with 50% of the dark-colored part, the density of the pixel is 50%. For example, the density of a pixel in the dark-colored part or solidly printed black-ink part is 100% and the density of a pixel in the light-colored part or white sheet is 0%. When the adjustment pattern image PT is printed in a black ink, the RGB value of the dark-colored part is (0, 0, 0) and the RGB value of the light-colored part is (255, 255, 255). The phrase "average density of an image" means an average value of the densities of a plurality of pixels included in an image.

Figure 5:
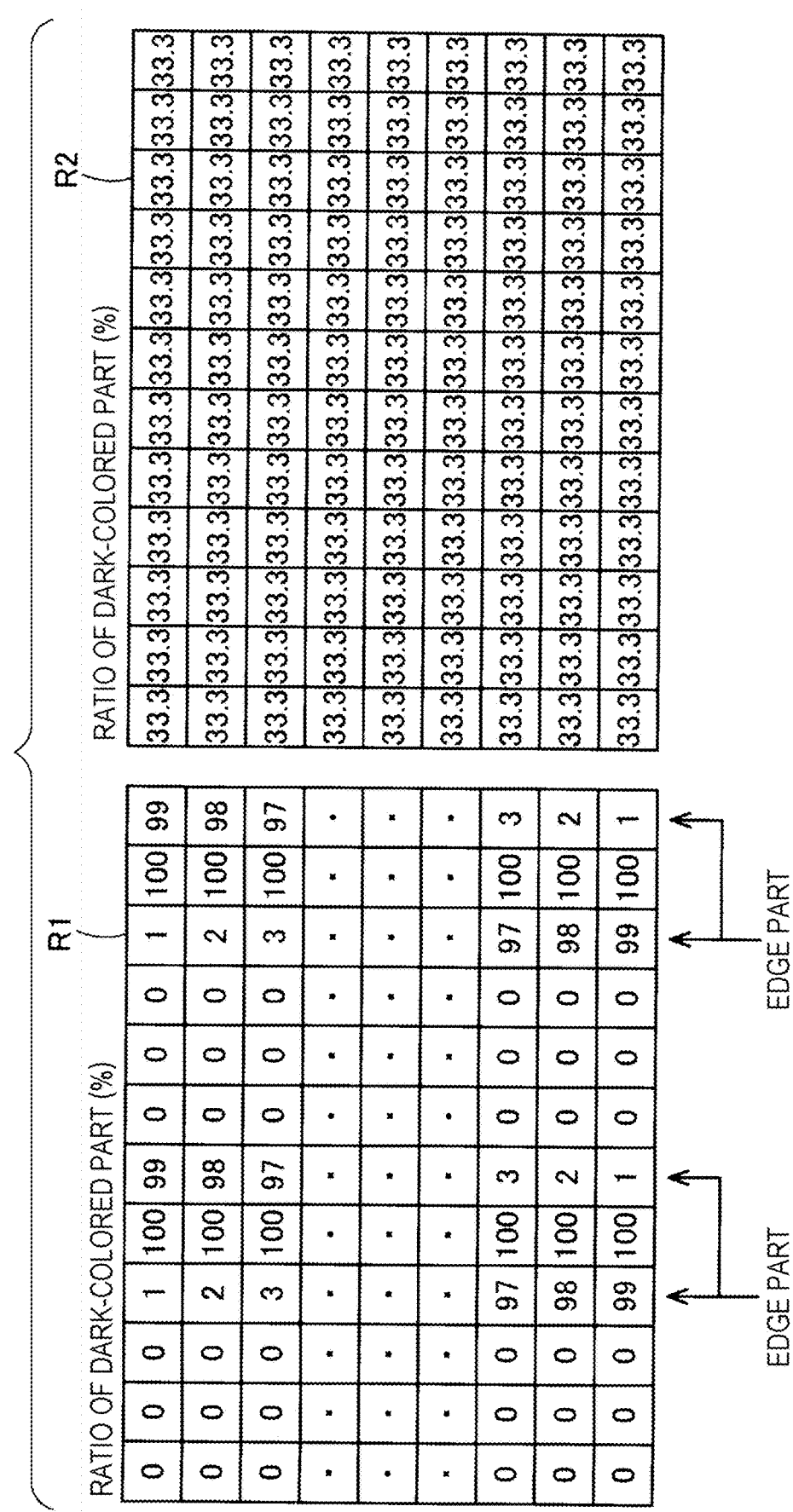
FIG. 5 is an explanatory diagram of exemplary density values of a first image and a second image.

FIG. 5 is an explanatory diagram of exemplary density values of the first image R1 and the second image R2. Here, the density value is expressed as a ratio of the dark-colored part. A pixel with a ratio of 100% of the dark-colored part is a dark-colored part and a pixel with a ratio of 0% of the dark-colored part is a light-colored part. A pixel with a ratio of 50% of the dark-colored part has a colorimetric density with an intermediate value between the dark-colored part and the light-colored part.

In the example of FIG. 5, the first image R1 includes a plurality of lines parallel to each other and the second image R2 does not include any edge pixels. More specifically, the first image R1 is such that a plurality of lines of the light-colored parts, each line having a width of three pixels, are regularly arranged in the vertical direction and a vertical line part is between two lines of the light-colored parts. The vertical line part includes a line segment of dark-colored parts having a width of one pixel and edge parts arranged on both sides of the line segment. It is preferable that the density value of each of the edge parts be as varied as possible. In the example of FIG. 5, multiple density values from 1% to 99% are set in the edge parts in the first image R1. Further, in the example of FIG. 5, the second image R2 is formed of pixels having a single density value only and does not have any edge parts. The expression "the second image R2 has less edge pixels than the first image R1" includes the case where the second image R2 has no edge pixels, as in this example. Which pixels in the edge parts are edge pixels depends on the edge extraction threshold. The density value of the second image R2 is equal to the average density value of the first image R1 and is 33.3% in this example.

FIG. 6 is an explanatory diagram of exemplary luminance values of the first image R1 and the second image R2 illustrated in FIG. 5. A luminance value Q is obtained by compensating for the γ characteristics for the density value D in the following Equation (4).

$$Q=255\times(1-D)^{1/\gamma} \quad (4)$$

where D is a density value and γ is a γ characteristic value.

For example, assuming a γ characteristic value of 2.2, the luminance value Q of a pixel with a density value of 33.3% is $255\times(1-0.333)^{1/2.2}=212$ and the luminance value Q of RGB is (R, G, B)=(212, 212, 212). The luminance values (R, G, B) of the first image R1 and the second image R2 are set in this way.

Any image including a plurality of edge pixels other than the one illustrated in FIG. 5 may be used for the first image R1. For example, the first image R1 with multiple pixel values may be created by creating a virtual pattern in which the light-colored parts and the dark-colored parts are drawn at equal intervals at a line width ratio of 50% and tilting the arrangement direction of the line segments in the virtual pattern. Alternatively, the first image R1 with multiple pixel values may be created by changing the ratio between a repetition cycle and a pixel cycle of the line segments in the virtual pattern and preventing the ratio from being a simple integer ratio. The first image R1 may be created by using a checkered pattern or a curved line. Any image with a lower ratio of edge pixels than the first image R1 and with an average density equal to that of the first image R1 other than the one illustrated in FIG. 5 may be used for the second image R2.

An adjustment pattern image PT in which the first image R1 and the second image R2 are arranged side by side is used in the example of FIG. 4, but another arrangement or shape of the first image R1 and the second image R2 may be employed. For example, the second image R2 may be formed as a frame around the first image R1. The first image R1 and the second image R2 may be prepared as independent images rather than being in a single adjustment pattern image PT.

In step S100 of FIG. 4, the edge extractor 222 performs the edge extraction processing on the first image R1 and the second image R2 by using a candidate value Th_1 of the edge extraction threshold. In the processing of FIG. 4, n candidate values Th_1 to Th_n are used for the edge extraction threshold, and the first candidate value Th_1 is first used in step S100. The number n of candidate values is an integer of 2 or more.

In step S200, the pre-print processing section 220 performs the pre-print processing including ink reduction processing on the edges. According to the present embodiment, the ink reduction processing entails performing the color conversion processing on an edge pixel by using the edge LUT 308. The common LUT 306 is applied to the non-edge pixels, and the ink amount of the edge pixels is smaller than that of the non-edge pixels. As described above, in the pre-print processing, the halftone processing is performed after the color conversion processing to thereby create print dot data.

In step S300, an adjustment pattern image PT_1 is printed according to the print dot data created in step S200. The adjustment pattern image PT_1 includes a first image R1_1 and a second image R2_1. The suffix "_1" of the symbols PT_1, R1_1, and R2_1 denotes correspondence with the first candidate value Th_1 of the edge extraction threshold. This rule is applicable to other symbols used in the following description.

In step S400, a user is caused to set the printed sheet on the scanner subsystem 400, and the printed adjustment pattern image PT_1 is read by the scanner subsystem 400.

In step S500, the threshold determination section 204 calculates an average density of the first image R1_1 and an average density of the second image R2_1 in accordance with the read adjustment pattern image PT_1 and calculates an average density difference Diff_1 therebetween. The resultant average density of each of the first image R1_1 and the second image R2_1 is also referred to as "printing average density".

The processing in steps S100 to S500 is similarly performed on the second and subsequent candidate values Th_2 to Th_n of the edge extraction threshold. Consequently, n average density differences Diff_1 to Diff_n are obtained for the n candidate values Th_1 to Th_n, respectively. In step S600, the threshold determination section 204 determines an appropriate edge extraction threshold Th_best by using the average density differences Diff_1 to Diff_n so that the average density difference Diff is as small as possible. For example, a value Diff_i having the smallest absolute value is selected from among the average density differences Diff_1 to Diff_n, and a candidate value Th_i corresponding thereto may be selected as the appropriate edge extraction threshold Th_best. Alternatively, the appropriate edge extraction threshold Th_best may be determined by interpolation so that the average density difference Diff is as small as possible. The thus-determined edge extraction threshold Th_best is also referred to as "best edge extraction threshold Th_best". The average density difference Diff between the first image R1 and the second image R2 is not limited to being zero as the best edge extraction threshold Th_best and may be within a predefined permissible range. In the present disclosure, matching of the printing average densities of the first image R1 and the second image R2 means that the average density difference Diff therebetween is within the predefined permissible range.

The best edge extraction threshold Th_best is stored as a processing parameter of the pre-print processing in the extraction condition storage section 304 in the memory 300 and is used later in the pre-print processing in normal printing. The best edge extraction threshold Th_best may be stored in memory in another ink jet printer having an ink jet function equivalent to that of the ink jet printer 100. Here, "another ink jet printer having an ink jet function equivalent to that of the ink jet printer 100" means a printer in which the number of usable inks, the printing resolution, and the dischargeable ink droplet sizes are within permissible error ranges relative to the respective values of the ink jet printer 100. Such ink jet printers do not require the scanner subsystem 400.

By use of the best edge extraction threshold Th_best, the printing average densities of the first image R1 with more edges pixels and the second image R2 with less edge pixels match also when the ink reduction processing is performed on the edge pixels, thereby preventing an excessively large or excessively small reduction in ink amount in the edge processing. Therefore, failures such as a partially printed character or a deficiently thin line due to an excessively large reduction in ink amount and ink bleeding due to an excessively small reduction in ink amount can be prevented from occurring.

The edge extraction thresholds Th(C), Th(M), and Th(Y) for the chromatic inks C, M, and Y other than black ink may be determined in the same procedure as in FIG. 4. The best edge extraction threshold is usually different depending on the kind of a printing medium. Thus, the best edge extraction threshold may be set depending on the kind of a printing medium.

The scanner subsystem 400 reads the adjustment pattern image PT_1 in step S400 of FIG. 4, but instead an optical sensor may be additionally provided to find the average density difference between the first image R1 and the second image R2 in accordance with a reflectivity measured by the optical sensor. For example, an optical sensor provided on a printing medium feeding path in the ink jet printer 100 enables the edge extraction threshold to be determined without the user's instruction to scan, thereby further enhancing user's convenience.

The above embodiment describes that an input image to be printed is expressed in the RGB color specification system, but the present disclosure is applicable also when an image in the CMYK color specification system is input. In this case, the above Equation (1) may be changed to a linear combination equation of CMYK values. The change has an advantage that a reduction in ink bleeding due to color mixture can be reflected relatively easily. On the other hand, the change keeps the effects by the equal ink reduction coefficient in at least chromatic colors.

As described above, according to the first embodiment, the edge extraction threshold Th, at which the printing average density of the first image R1 after the edge processing matches the printing average density of the second image R2 after the edge processing, is set as a processing parameter in the ink jet printer, thereby realizing not the excessive or insufficient edge processing but the appropriate edge processing. The failures such as a partially printed character or a deficiently thin line due to an excessively large reduction in ink amount and a blurred character or a blurred thin line due to an insufficient reduction in ink amount are conspicuous particularly when an image is repeatedly copied over several generations by use of the copy function of the ink jet printer. Thus, the above-described setting of the appropriate edge extraction threshold Th may be largely effective particularly when it is applied to an ink jet printer with the copy function.

B. Second Embodiment

Figure 7:
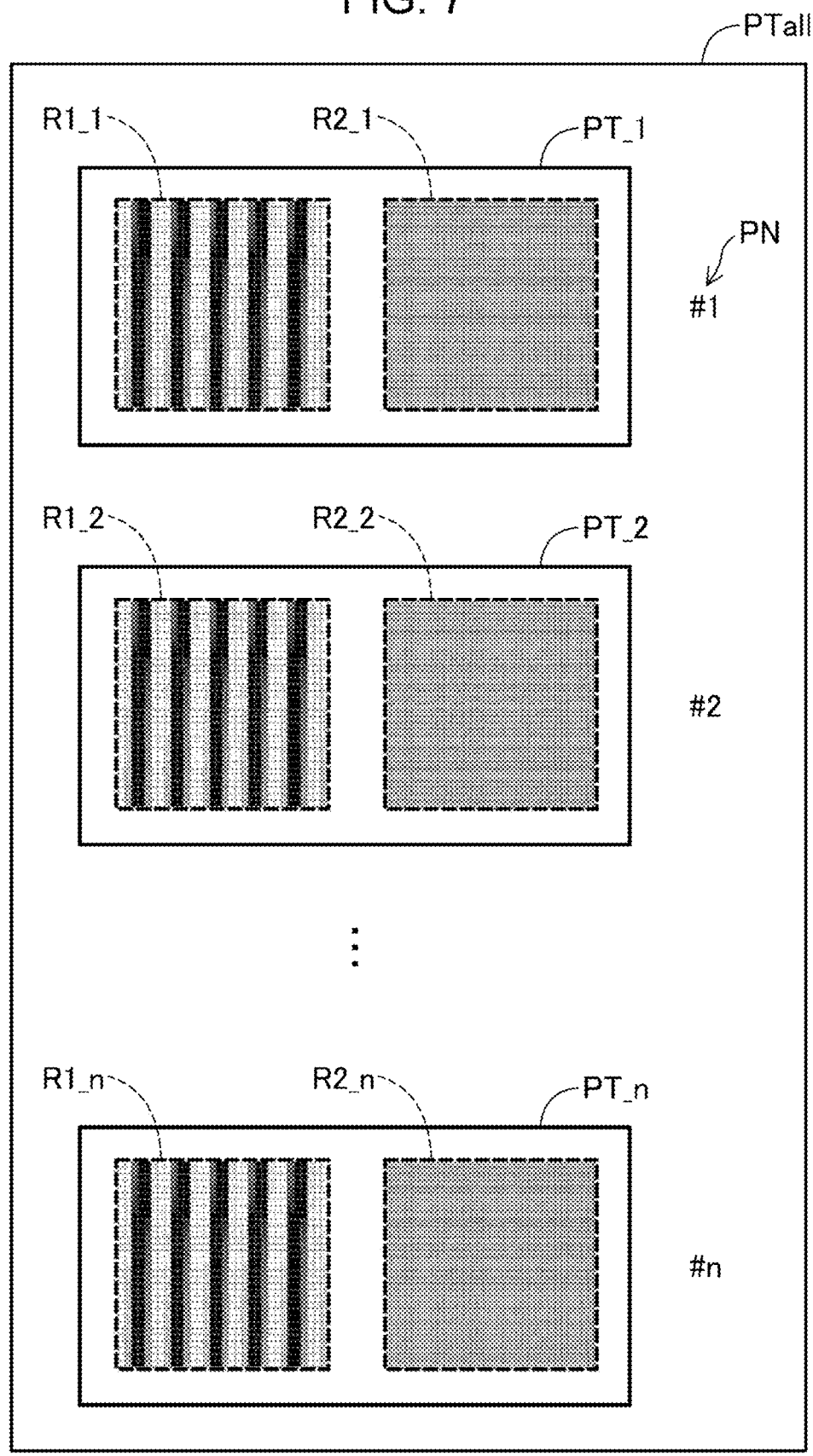
FIG. 7 is an explanatory diagram of an exemplary integrated adjustment pattern image printed according to a second embodiment.

FIG. 7 is an explanatory diagram of an example of a printed integrated adjustment pattern image PTall according to a second embodiment. A device configuration of the second embodiment is the same as that of the first embodiment illustrated in FIG. 1 and steps S100 to S300 in the processing procedure are the same as those of FIG. 4 in the first embodiment. The second embodiment is different from the first embodiment in that the processing corresponding to steps S400, S500, and S600 of FIG. 4 is performed by a worker by use of the integrated adjustment pattern image PTall of FIG. 7.

The integrated adjustment pattern image PTall of FIG. 7 includes all of the adjustment pattern images PT_1 to PT_n printed in the edge processing respectively by use of the candidate values Th_1 to Th_n of the edge extraction threshold. A candidate number PN indicating a suffix of the candidate values Th_1 to Th_n of the edge extraction threshold is printed adjacent to the adjustment pattern images PT_1 to PT_n. The worker observes the integrated adjustment pattern image PTall, selects one adjustment pattern image which is likely to have the smallest printing average density difference between the first image R1 and the second image R2, and sets its candidate number PN in the ink jet printer 100. The edge extraction threshold corresponding to the candidate number PN is set in the memory 300 as the best edge extraction threshold Th_best to be used in the edge processing.

In this way, the worker can determine the best edge extraction threshold Th_best not by scanning the adjustment pattern images PT by the scanner but by observing them. The second embodiment provides almost the same effects as the first embodiment. The scanner subsystem 400 may be omitted in the second embodiment.

C. Third Embodiment

Figure 8:
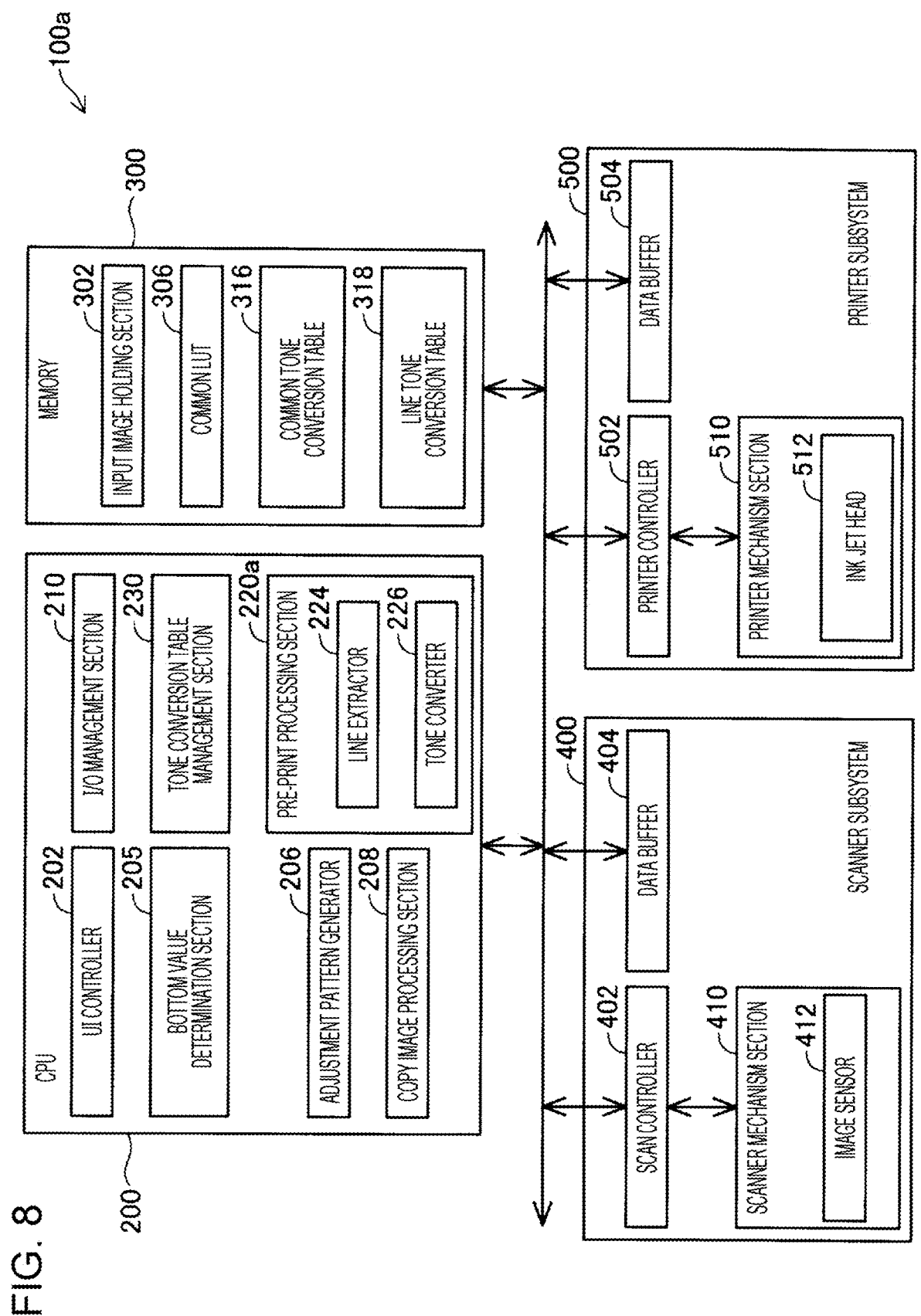
FIG. 8 is a block diagram of an ink jet printer according to a third embodiment.

FIG. 8 is a block diagram of an ink jet printer 100a according to a third embodiment. A configuration of the third embodiment is different from the first embodiment in the following points.

Functions of CPU 200

(1) The threshold determination section 204 according to the first embodiment is replaced with a bottom value determination section 205.

(2) The extraction condition management section 212 according to the first embodiment is omitted and the LUT management section 214 is replaced with a tone conversion table management section 230.

(3) While the pre-print processing section 220 according to the first embodiment includes the edge extractor 222, a pre-print processing section 220a according to the third embodiment includes a line extractor 224 and a tone converter 226.

Contents of Memory 300
(1) The extraction condition storage section 304 and the edge LUT 308 are omitted.
(2) A common tone conversion table 316 and a line tone conversion able 318 are stored.

According to the third embodiment, the pre-print processing section 220a performs tone conversion processing described below before the color conversion processing. That is, the pre-print processing section 220a first performs the tone conversion processing and then performs the color conversion processing and the halftone processing.

Figure 9:
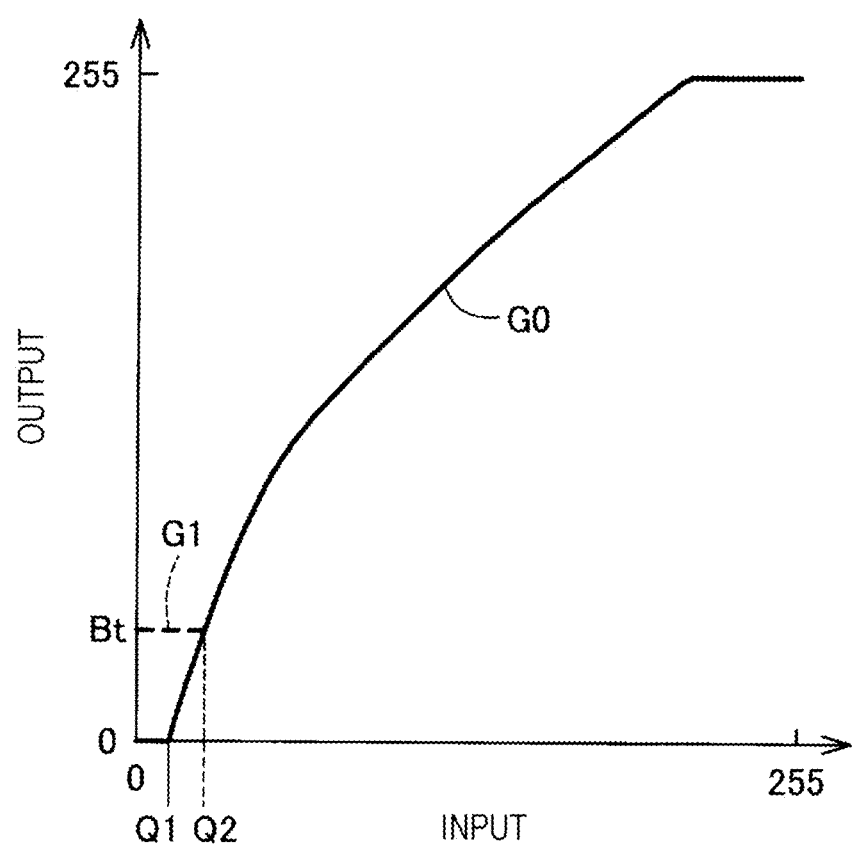
FIG. 9 is a graph of tone conversion properties according to the third embodiment.

FIG. 9 is a graph of tone conversion properties used in the tone conversion processing according to the third embodiment. The tone conversion processing is to convert an RGB value of an image to be printed by the tone conversion properties of FIG. 9. A part where an input value is close to 0 corresponds to a shadow part expressing a dark image. A normal tone conversion property G0 is kept at an output value 0 in a range of the input value 0 to Q1 and increases in the output value according to a convex curve at the input value Q1 or more. On the other hand, a line tone conversion property G1 is kept at a bottom value Bt at which the output value is not 0 in a range of the input value 0 to Q2, and increases in the output value according to the tone conversion property G0 at the input value Q2 or more. The bottom value Bt is a processing parameter in the pre-print processing.

In the example of FIG. 9, the normal tone conversion property G0 matches the line tone conversion property G1 at the input value Q2, but neither of them match in some cases. That is, the line tone conversion property G1 may be set as a curve offset slightly above from the normal tone conversion property G0 at other than the bottom value Bt. The normal tone conversion table 316 of FIG. 8 represents the normal tone conversion property G0 of FIG. 9 and the line tone conversion table 318 of FIG. 8 represents the line tone conversion property G1 of FIG. 9.

When the luminance value of the shadow part is increased to the bottom value Bt in tone conversion on a line, the ink amount at the line reduces to thereby reduce a possibility that ink bleeding occurs when the line is printed. However, the shape of the line is broken at an excessively large reduction in ink amount due to the excessively large bottom value Bt and ink bleeding occurs around the line at an excessively small reduction in ink amount due to the excessively small bottom value Bt. According to the third embodiment, the appropriate bottom value Bt is determined to prevent such failures from occurring.

Figure 10:
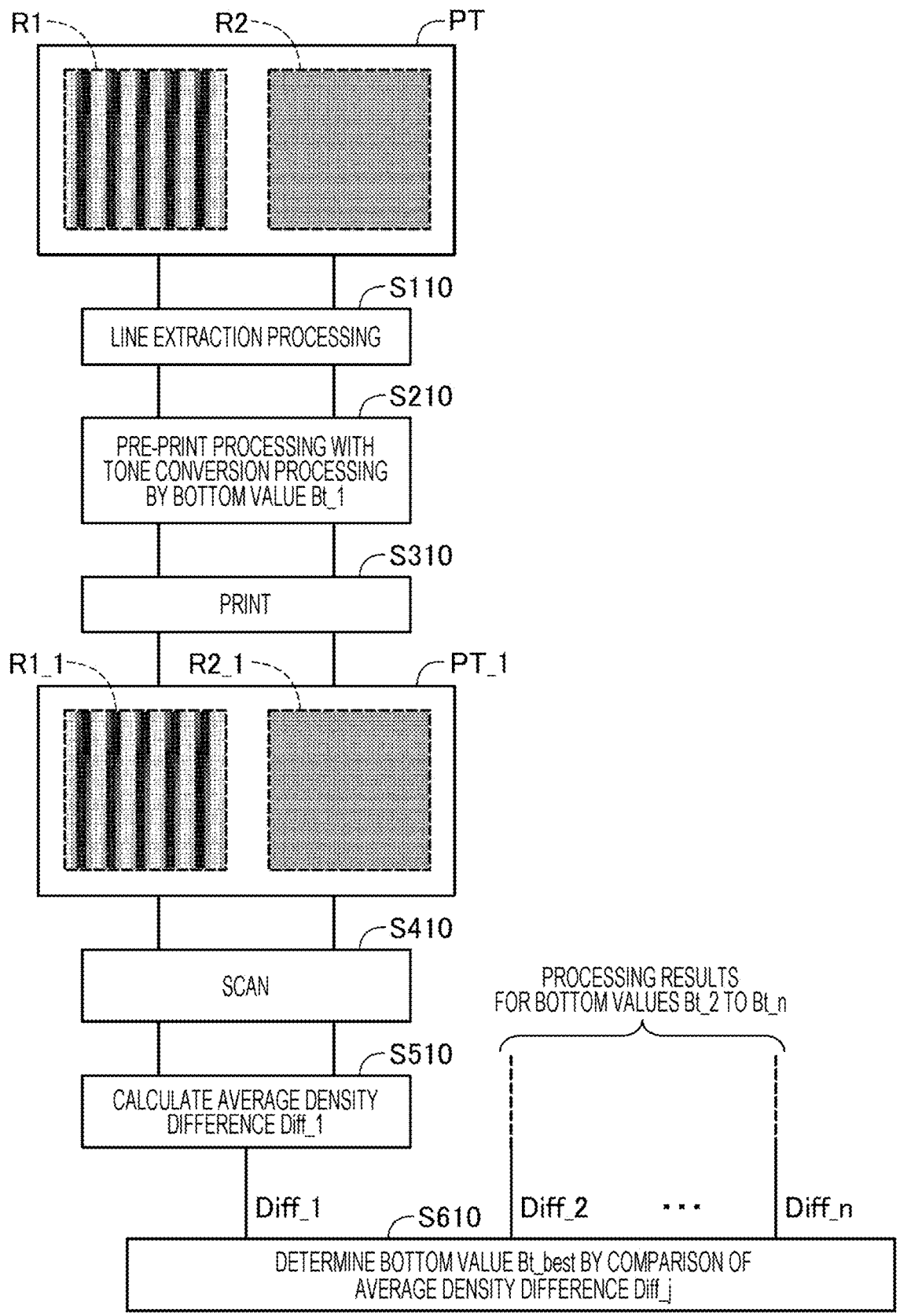
FIG. 10 is an explanatory diagram of a procedure of determining a bottom value in tone conversion according to the third embodiment.

FIG. 10 is an explanatory diagram of a procedure of determining the bottom value Bt in tone conversion according to the third embodiment. The procedure is similar to the procedure of FIG. 4 according to the first embodiment and steps S100 to S600 of FIG. 4 are replaced with steps S110 to S610, respectively. Processing of determining a bottom value Bt(K) for black ink will be described below as in the first embodiment.

An adjustment pattern image PT used in the processing of FIG. 10 may be the same as the adjustment pattern image PT used in the first embodiment. That is, the first image R1 includes a plurality of edge pixels, and the second image R2 has a lower ratio of edge pixels than the first image R1 and has an average density equal to that of the first image R1. The first image R1 including a line may be used in the third embodiment.

In step S110, the line extractor 224 performs the line extraction processing on the first image R1 and the second image R2. The line extraction processing is already described and its processing content will not be described. In step S210, the tone converter 226 performs the tone conversion processing by a candidate value Bt_1 of the bottom value. A plurality of candidate values Bt_1 to Bt_n of the bottom value are used in the processing of FIG. 10, and in step S210, the first candidate value Bt_1 is first used. Specifically, a property with the bottom value Bt_1 is used for the line tone conversion property G1 of FIG. 9. In the pre-print processing in step S210, the color conversion processing and the halftone processing are performed after the tone conversion processing to generate print dot data.

In step S310, an adjustment pattern image PT_1 is printed according to the print dot data created in step S210. In step S410, the printed adjustment pattern image PT_1 is read by the scanner subsystem 400. In step S510, the bottom value determination section 205 calculates an average density of the first image R1_1 and an average density of the second image R2_1 in accordance with the read adjustment pattern image PT_1 and calculates an average density difference Diff_1 therebetween.

The processing in steps S110 to S510 is similarly performed on the second and subsequent candidate values Bt_2 to Bt_n of the bottom value so that n average density differences Diff_1 to Diff_n for the candidate values Bt_1 to Bt_n are acquired, respectively. In step S610, the bottom value determination section 205 determines an appropriate bottom value Bt_best by the average density differences Diff_1 to Diff_n so that the average density difference Diff is as small as possible. The thus-determined bottom value Bt_best is also referred to as "best bottom value Bt_best." The tone conversion property G1 using the best bottom value Bt_best is stored as the line tone conversion table 318 in the memory 300 and is used later in the pre-print processing in normal printing.

The printing average densities match between a first image R1 and a second image R2 by use of the best bottom value Bt_best also when the tone conversion processing is performed on more first images R1 and more second images R2, and an reduction in ink amount in the edge processing is prevented from being excessively large or small. Therefore, failures such as a broken line due to an excessively large reduction in ink amount and ink bleeding due to an excessively small reduction in ink amount can be prevented.

The bottom values Bt(C), Bt(M), and Bt(Y) for the chromatic inks C, M, and Y other than black ink K may be determined in the same procedure as in FIG. 10. The best bottom value is usually different depending on the kind of a printing medium. Thus, the best bottom value may be set depending on the kind of a printing medium each time.

As described above, according to the third embodiment, the bottom value Bt, at which the printing average density of the first image R1 after the tone conversion processing matches the printing average density of the second image R2 after the tone conversion processing, is set as a processing parameter in the ink jet printer, thereby realizing the appropriate tone conversion processing by the bottom value Bt without an excessively large or small reduction in ink amount.

D. Other Embodiment

The present disclosure is not limited to the above embodiments and may be realized in various aspects within the scope without departing from its spirit. For example, the present disclosure may be realized in the following aspects. The technical characteristics in the above embodiments corresponding to the technical characteristics in each aspect described below may be replaced or combined as appropriate to solve part or all of the problems of the present disclosure or to achieve part or all of the effects of the present disclosure. The technical characteristics may be deleted as appropriate unless described as essential ones in the present specification.

For example, all of the first images R1 and the second images R2 may be printed on the same sheet and may be scanned and read at one time, or some of them may be printed on different sheets of the same type and may be scanned and read several times. When the first images R1 and the second images R2 are printed on the same sheet and read by a scanner, the first images R1 and the second images R2, which correspond to R1_1 to R1_n and R2_1 to R2_n, respectively, are specified in accordance with the correspondences between the printed positions and the suffixes 1 to n to thereby read and acquire the average densities. Only one second image R2 with no edge pixel may be printed and compared with the respective first images R1. Any shape and size large enough to read the edges or the average densities may be used for the first images R1 and the second images R2. All of the sizes and shapes of the first images R1 and the second images R2 may be different or the same.

Step S100 and step S200 of FIG. 4 are previously performed to create and store print data for all the thresholds in nonvolatile memory, and may be separated from their subsequent steps. In this case, the same print data may be repeatedly used for a plurality of printing mediums to perform printing in step S300, or the same print data may be repeatedly used in a plurality of ink jet printers to perform printing in step S300.

The ink reduction coefficient or the edge LUT may be adjusted instead of adjusting the edge extraction threshold or the bottom value, and the ink reduction coefficient or the edge LUT may be adjusted in addition to the edge extraction threshold or the bottom value. That is, the ink reduction coefficient and the edge LUT may be processing parameters. Specifically, the first image or the second image may be printed by changing the ink reduction coefficient or the edge LUT to find the ink reduction coefficient or the edge LUT at which the printing average densities match therebetween after the printing, and the found ink reduction coefficient or edge LUT may be stored in the memory and used for printing. However, the ink reduction coefficient and the edge LUT are limited by the smallest ink droplet amount or the like at which the printer is available, or cannot be independently changed for each color, and thus not the ink reduction coefficient or the edge LUT but the edge extraction threshold or the bottom value may be adjusted.

(1) According to a first aspect of the present disclosure, a method for producing an ink jet printer configured to print based on a processing parameter is provided. The method may include (a) printing, in association with a plurality of candidate values of a processing parameter, a first image including a plurality of edge pixels and a second image with a lower ratio of edge pixels than the first image and an average density equal to that of the first image, (b) determining a value of the processing parameter so that a printing average density of the first image that is printed and exhibits bleed matches a printing average density of the second image that is printed and exhibits bleed, and (c) storing, in memory in an ink jet printer, the determined value of the processing parameter. With the method, the value of the processing parameter, at which the printing average density of the first image after the pre-print processing matches the printing average density of the second image after the pre-print processing, is set for the ink jet printer to thereby complete an ink jet printer configured to realize the appropriate pre-print processing without the low average densities due to the excessive pre-print processing or the high average densities due to the insufficient pre-print processing and to appropriately print. The method may be performed as part of the first production in an ink jet printer manufacturer's factory. The method may be performed at a user's place as a method for completing an ink jet printer with good printing quality in which the pre-print processing is neither excessive nor insufficient from an ink jet printer in which the pre-print processing is excessive or insufficient, or as a reproducing method.

(2) In the method, (a) may include performing an edge processing including edge extraction processing of detecting an edge pixel within an image by use of an edge extraction threshold and ink reduction processing of reducing the ink amount in the detected edge pixel, and the processing parameter may be the edge extraction threshold. With the method, the appropriate edge processing can be realized without the excessive or insufficient edge processing.

(3) In the method, an ink amount reduction coefficient in the ink reduction processing may be set at a constant value common in a plurality of chromatic inks. With the method, a color mixture ratio does not change between before and after the ink reduction processing even at an edge part reproduced by color mixture of a plurality of chromatic inks, thereby preventing a change in color at the edge part.

(4) In the method, the edge extraction threshold may be set for each of the plurality of chromatic inks. With the method, the edge extraction threshold for each chromatic ink can be set at an appropriate value while preventing a change in color at the edge part.

(5) In the method, (a) may include performing line extraction processing of extracting a line within an image and tone conversion processing of increasing a luminance value of a shadow part in the extracted line to a bottom value, and the processing parameter may be the bottom value. With the method, the appropriate tone conversion processing can be realized to prevent ink for a line from being excessive or insufficient.

(6) In the method, the first image is an image that includes a plurality of lines parallel to each other, and the second image is an image that does not include any edge pixels in some cases. With the method, the first image and the second image can be easily prepared.

(7) In the method, when n is assumed as an integer of 2 or more, (a) may include performing pre-print processing on image data of the first image and the second image by use of n candidate values of the processing parameter and printing, on a printing medium, n adjustment pattern images each including the first image and the second image, and (b) may include acquiring a printing average density of the first image and a printing average density of the second image in the n adjustment pattern images, and determining, based on the printing average density of the first image and the printing average density of the second image in the n adjustment pattern images, a value of a processing parameter of the pre-print processing. With the method, an appropriate value of the processing parameter can be easily determined.

(8) In the method, (c) may include storing, in the memory, in association with the kind of a printing medium, the value of the processing parameter. With the method, an appropriate value of the processing parameter can be set depending on the kind of a printing medium.

(9) According to a second aspect of the present disclosure, an ink jet printer configured to print an image is provided. The ink jet printer includes an acquisition section configured to acquire a first image including a plurality of edge pixels and a second image with a lower ratio of edge pixels than the first image and an average density equal to that of the first image, and a print section configured to print the first image and the second image. The print section prints so that a printing average density of the first image that is printed and exhibits bleed matches a printing average density of the second image that is printed and exhibits bleed.

(10) According to a third aspect of the present disclosure, a method for producing an ink jet printer configured to print by performing pre-print processing of reducing the ink amount in a specific part of an image is provided. The method includes (a) preparing image data including a first image including a plurality of edge pixels and a second image with a lower ratio of edge pixels than the first image and an average density equal to that of the first image, (b) determining a value of a processing parameter of the pre-print processing so that a printing average density of the first image after the pre-print processing is performed matches a printing average density of the second image after the pre-print processing is performed, and (c) storing, in memory in an ink jet printer, the value of the processing parameter.

The present disclosure is not limited to the above aspects, and may be realized in other aspects such as an ink jet printer setting method or a method for determining a processing parameter in pre-print processing.

What is claimed is:

1. A method for producing an ink jet printer, comprising:
(a) performing pre-print processing including edge extraction processing on image data for detecting edge pixels within a first image and a second image by using n candidate values of an edge extraction threshold, n being an integer of 2 or more, the first image including a plurality of edge pixels and the second image including a lower number of edge pixels than the first image and an average density equal to an average density of the first image, and
printing on a printing medium, by discharging ink droplets from nozzles directly onto the printing medium, n adjustment pattern images respectively corresponding to the n candidate values of the edge extraction threshold, with each of the n adjustment pattern images including the first image and the second image that have been processed using a respective one of the candidate values of the edge extraction threshold;
(b) determining one of the n candidate values of the edge extraction threshold with which a printing average density of the first image in a corresponding one of the n adjustment patterns that is printed on the printing medium matches a printing average density of the second image in the corresponding one of the n adjustment patterns that is printed on the printing medium; and
(c) storing, in memory in an ink jet printer, the one of the n candidate values that is determined as a value of the edge extraction threshold so that pre-print processing of image data of an image to be printed by the ink jet printer is performed using the edge extraction threshold stored in the memory.

2. The method according to claim 1, wherein
(a) includes performing ink reduction processing of reducing an ink amount in the edge pixel that is detected.

3. The method according to claim 2, wherein
an ink amount reduction coefficient in the ink reduction processing is set as a constant value common across a plurality of chromatic inks.

4. The method according to claim 3, wherein
the edge extraction threshold is set for each of the plurality of chromatic inks.

5. The method according to claim 1, wherein
the first image is an image that includes a plurality of lines parallel to each other, and
all pixels in the second image have the same density value.

6. The method according to claim 1, wherein
(c) includes storing, in the memory, in association with a kind of printing medium, the value of the edge extraction threshold.

* * * * *